United States Patent [19]
Davies

[11] Patent Number: 4,799,258
[45] Date of Patent: Jan. 17, 1989

[54] APPARATUS AND METHODS FOR GRANTING ACCESS TO COMPUTERS

[75] Inventor: Donald W. Davies, Sunbury-on-Thames, England

[73] Assignee: National Research Development Corporation, London, England

[21] Appl. No.: 699,447

[22] Filed: Feb. 7, 1985

[30] Foreign Application Priority Data

Feb. 13, 1984 [GB] United Kingdom ................. 8403699
Jun. 26, 1984 [GB] United Kingdom ................. 8416241

[51] Int. Cl.$^4$ ............................................. H04L 9/02
[52] U.S. Cl. ...................................... 380/21; 380/23; 380/24; 380/25; 380/30
[58] Field of Search ............... 178/22.08, 22.09, 22.11; 380/23, 24, 25, 43, 30, 21

[56] References Cited

U.S. PATENT DOCUMENTS

| | | | |
|---|---|---|---|
| 4,211,919 | 7/1980 | Ugon | 178/22.08 |
| 4,453,074 | 6/1984 | Weinstein | 178/22.11 |
| 4,458,109 | 7/1984 | Mueller-Schloer | 380/24 |
| 4,471,216 | 9/1984 | Herve | 380/25 |
| 4,484,027 | 11/1984 | Lee et al. | 380/43 |
| 4,672,533 | 6/1987 | Noble et al. | 380/25 |
| 4,679,226 | 7/1987 | Muehleisen | 380/25 |
| 4,713,753 | 12/1987 | Boebert et al. | 380/25 |

FOREIGN PATENT DOCUMENTS 1031421 1/1985 European Pat. Off. .
2121569 12/1983 United Kingdom .

OTHER PUBLICATIONS

"Multinser Cryptographic Techniques", by Diffie et al., AFIPS–Conference Proceedings, vol. 45, pp. 109–112, 6/8/76.

Security Dynamics, "Guard Tour System", Jan. 1984.
IBM Technical Disclosure, by A. Gurnge', "Preventing Unauthorized Access to Diskette-Loaded Microcode", vol. 21, #2, 7/78.
Donald W. Davies, "Use of the 'Signature Token' to Create a Negotiable Document", Advances in Cryptology, Proceedings of Crypto, Aug. 1983, pp. 377–383.
Donald W. Davies et al., "The Application of Digital Signatures Based on Public Key Cryptosystems," Division of Numerical Analysis and Computer Science, National Physical Laboratory, Proc. 5th ICCC, Oct. 1980.

Primary Examiner—Salvatore Cangialosi
Attorney, Agent, or Firm—Cushman, Darby & Cushman

[57] ABSTRACT

When a computer user is granted access to certain capabilities of a computer he is often given a password signifying these capabilities. A problem arises in that unauthorized users may copy the password and so gain access to the capabilities. In the present invention an enciphered message relating to capabilities is stored in the tamper-resistant store of a circuit contained by a token. The store also holds the secret key of a public key encryption system so that the enciphered message and a distinctive message can be transformed ("signed") using the secret key and passed to the computer. The corresponding public key may then be used by the computer to carry out an inverse transverse form and check the enciphered and distinctive messages against signals sent from the token. If this check is successful the required access is granted. Preferably the public key is part of the enciphered message, especially where the token grants access to a distributed or fragmented computer system, since this avoids the necessity of making public keys available throughout a computer system.

24 Claims, 3 Drawing Sheets

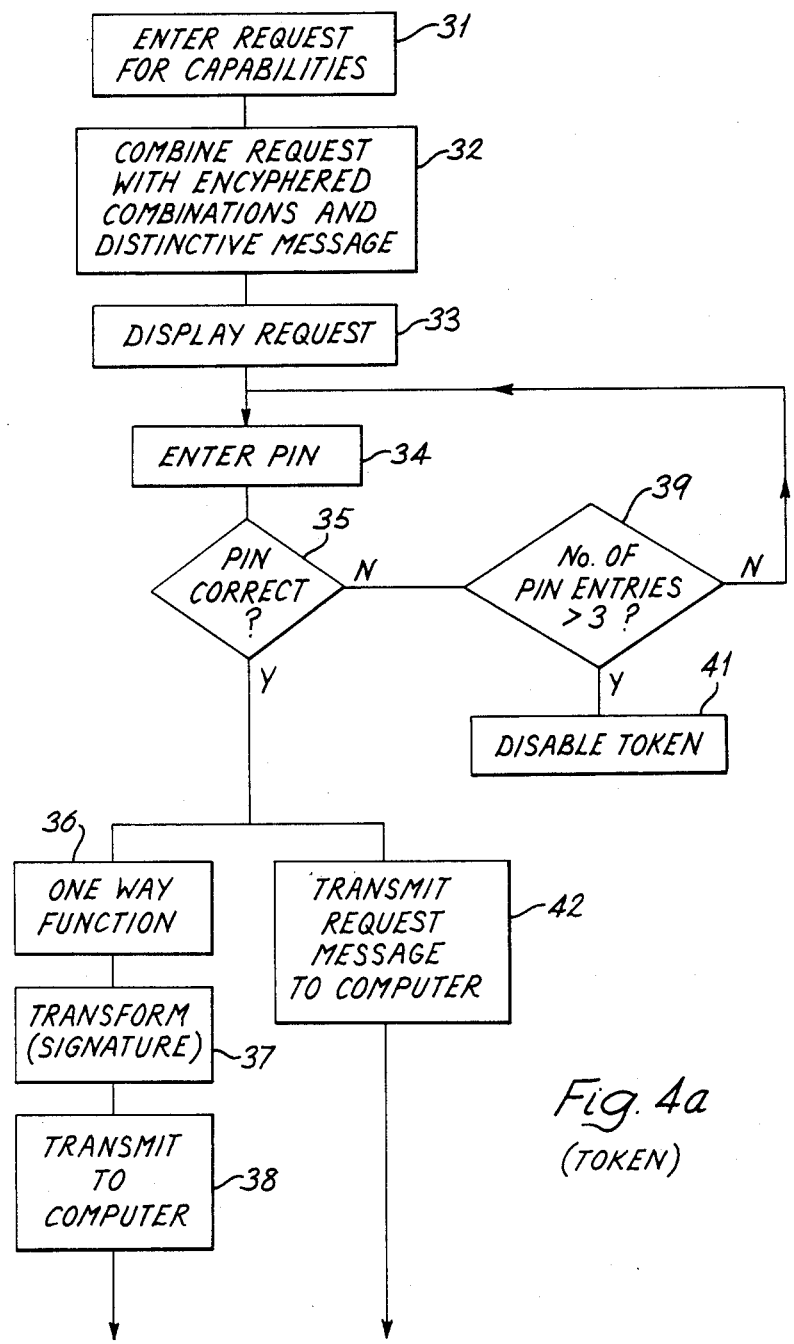
Fig. 4a (TOKEN)

(COMPUTER)

APPARATUS AND METHODS FOR GRANTING ACCESS TO COMPUTERS

The present invention relates to methods and apparatus for providing authorised users with access to restricted facilities such as "capabilities" of a computer Any access facility offered by a computer can be coded in a record known as a capability and associated with a user who is to be allowed use of that facility. The coded record may relate to a certain mode of access to a stored file, for example read, write, append, run program, and the record then contains at least two fields: file identity, access mode.

For each user, a file or files of capabilities are stored in the computer. As part of the rules of access control, these are carefully protected by hardware or software methods to prevent illegal manipulation of capabilities, such as illegally creating new ones or copying those belonging to other users. Therefore, capabilities are not allowed outside the computer's protected store and are treated in a different way from other stored data.

The term "computer" in this specification comprises a distributed system of separate machines as well as a single machine.

If a user is given information, for example in the form of a password and the numbers of certain files, so that he can access the computer, he can also pass this information on to another user. This is so even if the first mentioned user is only allowed an enciphered form of the file numbers which the computer translates before giving access, and may do so in a way which gives only limited specified capabilities to the user. Further, owners of data or programs may wish to give an access message to certain other persons, such as licensees, but not wish to have this message copied.

Authentication for other purposes than providing access to computer capabilities has been achieved using a public key encryption system in which, for example, a message can be transformed using a secret key and transformed back to its original form (inverse transformed) using a public key but the secret key cannot be determined from a knowledge of the public key or from transformed messages. Public key encryption systems are well known and have been described many times, notably by Rivest, Shamir and Adleman in "A method for obtaining digital signatures and public key cryptosystems", Communication of the Association for Computing Machinery, Volume 21, No. 2, February 1978, page 120. Digital signatures of another kind have been described by Ong, Schnorr and Shamir.

In order to authenticate a message the signer has in some known methods employed a computer to calculate a digest of the message, for example using a one-way function, and then he has entered his secret key to transform the result. The transformed digest together with the message itself are passed to the recipient who uses the public key to inverse transform the transformed digest and he compares the result with the digest which he calculates himself according to known rules. If the two are equal then the message is authenticated. This procedure is described by D. W. Davies and W. L. Price in the paper "The application of digital signatures based on public key cryptosystems", Proc. 5th ICCC, Atlanta Ga., October 1980.

In this specification "transformation" or "transforming" are operations carried out in a system which has two keys either of which may be used for transformation when the other key is required for inverse transformation. However the knowledge of one key does not allow the other key to be determined even when a transformed message is available, thus preventing both of the operations of transformation and inverse transformation.

Authentication apparatus is known for the purpose of automatically creating digital messages using input messages from a particular source. The automatically created messages can be positively identified as originating from the source if the input messages are available. Such automatically created messages are known as digital signatures and such apparatus is hereinafter referred to as a signature token.

To overcome the above-mentioned problem of giving access to computer capabilities an authentication method, apparatus and a programmed computer according to first, second and third aspects of the invention are provided.

An authentication method according to the first aspect of the invention for granting access to a computer comprises as a preliminary step, storing a secret key in authentication apparatus together with enciphered information representing the capabilities to be granted by the computer and either the public key corresponding to the secret key or information which identifies the public key, and as steps employed when access is to be granted, using the authentication apparatus to form one part of an output message to contain the enciphered information and transforming as hereinbefore defined, using the secret key, a distinctive message to generate another part of the output message, using the computer to decipher the enciphered information and inverse transform the said other part of the output message using the public key, and comparing digital signals representing the result of the inverse transform with digital signals representing the distinctive message or information derived therefrom and granting the required access only if the digital signals compared are the same.

Authentication apparatus according to the second aspect of the invention for providing access to a computer comprises a store containing a secret key for carrying out a transformation as hereinbefore defined and enciphered information representing capabilities to be granted by a computer and either the public key corresponding to the secret key or information which identifies the public key, input/output means for receiving and transmitting electrical digital messages to, and from, the apparatus, and means for forming one part of an output message to contain the enciphered information and for transforming, using the secret key, a distinctive message, or a message determined therefrom, to generate another part of the output message.

An advantage of the invention is that capabilities are stored outside the computer or computer system in a secure way so reducing the storage requirements of the computer or system. This advantage is significant where many users have access to many computers, since capabilities are stored only once.

The authentication apparatus of the second aspect of the invention may be regarded as digitally signing the distinctive message and may therefore be regarded as a special form of a signature token.

The distinctive message may comprise at least one of the following: an indication of where the output message stands in a sequence of such messages, the time of day, the date and a random number.

Preferably the apparatus, in operation, combines the distinctive message and the enciphered message before transforming the combination to form the said other part of the output message.

According to the third aspect of the invention there is provided a computer programmed to decipher one part of a message transmitted to the computer, the said one part containing, in enciphered form, information representing access to computer capabilities and a public key or information identifying the public key, and to inverse transform another part of the message using the public key to determine whether the result after inverse transformation contains a predetermined distinctive message, and if so to provide the access conferred.

Where the said other part of the output message from the authentication apparatus is expected to include, in transformed form, the said one part of the output message, the computer is programmed to provide access to capabilities only if on inverse transforming the said other part of the output message, the public key and the capabilities are as contained in the said one part.

The authentication apparatus preferably pre-processes messages in the way mentioned above to provide shorter messages for transformation and the computer carries out the same preprocessing before granting access on the basis of a correct inverse transformed message.

By using a signature token to sign the distinctive message and preferably the enciphered message at the time a request for access is made, the use of copied access messages is prevented.

According to a fourth aspect of the present invention there is provided authentication apparatus which can easily be held in one hand and comprises input/output means for receiving electrical digital messages to be "transformed" and for transmitting transformed messages, an electrical store which is physically tamper-resistant holding a secret electrical digital key for use in carrying out transformation as hereinbefore defined, the key being so stored that it cannot be read out by applying signals to the apparatus.

transformation means for transforming, when enabled, an input message or a message related thereto using the secret key to generate an output message for transmission by the input/output means, enabling means for enabling the transformation means on receipt of a personal input to the apparatus direct from a particular person or at least one of a particular group of persons, the personal input being specific to that person or those persons, and a display for displaying at least part of the message to be transformed.

The enabling means may include a keyboard and means for recognising a personal identification number (PIN), transformation only taking place when the correct PIN number has been entered by way of the keyboard. An alternative authorising means may include a graphical input means and means for recognising a signature written thereon. Where the enabling means includes a keyboard, the need to send the PIN through a separate terminal which may not be completely secure is avoided.

Certain embodiments of the invention are now described with reference to the accompanying drawings, in which:

FIGS. 4a and 4b are flow diagrams of a request for access to a computer system.

An essential part of controlling access to capabilities of computer systems is apparatus, for example a token which can store certain information, as is explained later, and provide a digital signature. Such a token is therefore first described.

Figure 1:
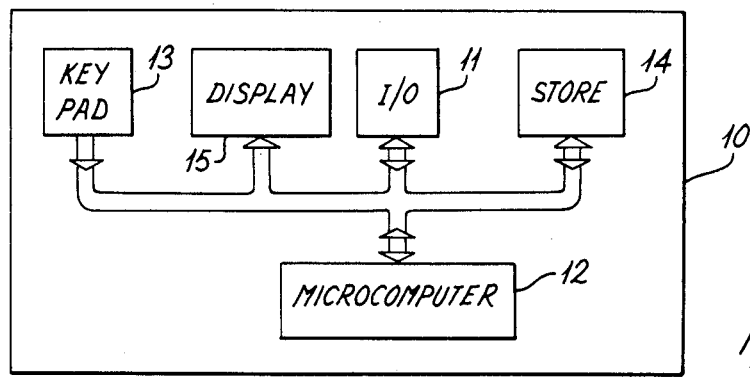
FIG. 1 is a block diagram of apparatus according to the invention.

In FIG. 1 the housing for a token is represented by a line !0 and may for example be a thin plastic card containing integrated circuits, or a small container. Many other suitable housings can be envisaged, the main requirements being small size for convenience of handling and difficulty of removing the, or at least one of the, integrated circuits without damaging it.

The token includes an input/output port 11 which may take many forms such as electrical contacts, or a transmitter and receiver for ultrasonic, induction, optical or electromagnetic linkage. Where the housing is in the form of a card or flat container, it may be placed on a shelf to allow optical or other communication to be established, and a light source may be provided to project light on to solar cells on the token to provide power for the integrated circuits. The token may instead be powered by way of electrical contacts, induction or by a battery.

The token includes a microcomputer 12 whose functions include recognising a personal identification number (PIN) entered by way of a key pad 13, using a one-way function to transform data entered by way of he port 11, and transforming the result using the RSA algorithm mentioned above and a secret key held in a store %4. In order to safeguard the secret key the store 14 is tamper-resistant and may comprise a volatile store located in a module which also contains a battery or battery connections for the store, the module being so constructed that the store is cleared if an attempt is made to obtain the secret key by opening the module. The token may include means for overwriting the contents of the store when power is reduced or removed from it or when a short circuit is applied to the power supply of the token. In addition the store may be attached to a pre-stressed member which breaks it should an attempt be made to open the housing or a module containing the store.

The token is so constructed and/or programmed that it is impossible to read out this key by way of the input/output port 1 regardless of what signals are applied to the port.

The microcomputer 12 also controls a display 15 to display the type of operation being carried out, for example access to a computer, and also other information which may be relevant.

Figure 2:
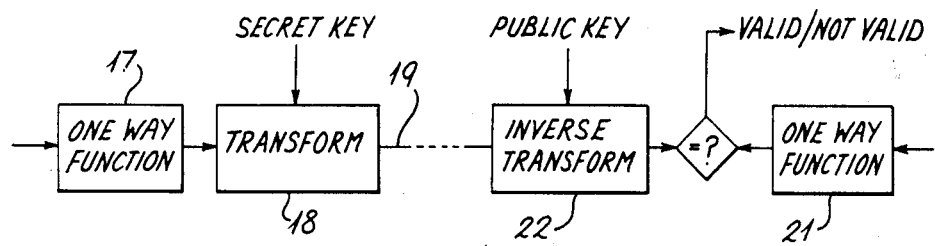
FIG. 2 is a flow diagram illustrating the generation of a digital signature.

When a digital signature is required information to be signed is represented in digital electronic form and handled according to the flow diagram of FIG. 2. The information is passed as digital signals by way of the port 11 to the token where the user enters his PIN via the key pad 13, and the microcomputer 12 checks this number. If satisfactory the microcomputer pre-processes the information in an operation %7 according to a stored program. The pre-processing is carried out using a one-way (that is non-reversible) function which is not secret but provides an output which depends on every item making up the information. A suitable method of carrying out pre-processing is described by D. W. Davies and W. L. Price in the above-mentioned paper. The resultant message must be drawn from a large set so that if a fraudulent change were made in the message it would be almost impossible to find a suitable change which on transformation would result in the same resultant message. One reason for carrying out the transformation is that the time taken for transformation is reduced to avoid intolerably long transformation times.

Using the public key encryption system and the secret key held by the token the number derived by means of the one-way function is transformed by the microcomputer 12 again using a stored program in an operation 18 and the number obtained is the digital signature which is transmitted with the plain text. In this way neither the secret key nor the PIN leaves the token %0 and therefore they cannot be copied.

In order to validate the signature generated in the way described above, the message passed to the token, which for computer access applications is locally available, is processed using the same one-way function as is used in operation 17 by carrying out a further operation 21 in a computer (not shown) in FIG. 2. In addition the signature transmitted to the checking computer as indicated by a line 19 is inverse transformed in an operation 22 using the originator's public key. The signature is only validated if operations 21 and 22 both provide the same number.

Although the information and signature can be copied, the information cannot be altered to change any item since if such a change were made a new signature would be required or the authentication procedure would fail. Only the authorised signatory using the correct token can provide a new signature.

An example of controlling access to capabilities of a computer system will now be considered. Certain files are to be accessed only by entering a specific message which identifies the file and whether it can be read, amended or enlarged. The message therefore confers a capability of the computer to a person who knows the message. If it is required to prevent forgery of these messages, a particular user may be given a message in enciphered form and when the user enters this form the computer system deciphers it to provide access to the required file. However the user who is given the enciphered form can pass it on to other users who may not be authorised for access to this particular file. The problem can be overcome by a method which is now described.

A public key and a corresponding secret key are created and the secret key is sealed in a signature token such as that of FIG. 1. According to the invention capabilities are also stored by a user and any computer which is to generate capabilities for storage by a user must first identify the user. To do this the user's identity is established in some way and the public key of the user's token, pk, is introduced to the computer. For example, the user may become a subscriber to a commercial system, where the user pays for the service received. In another example, the computer's facilities may be restricted or confidential, and then the user's acceptability is attested by another user, such as a responsible officer.

The computer or system granting capabilities employs a secret key kos to encipher capabilities for external storage. The capabilities are usually enciphered together with the user's public key and the enciphered combination can be expressed as:

$$E_{kos}(\text{pk, file identity, access mode})$$

These data, or similar data for other capabilities, link the user identity represented by the key pk with the coded form of the capability as used internally. In an alternative and shorter form, the key pk may be replaced by the user identity and a separate table in the computer gives the key pk as a function of user identity. However it is advantageous to use pk as will be described below. Because the key kos is a secret of the computer, new capabilities for external storage cannot be created by users. The cipher used may be a symmetric cipher, with kos as its key, or it can be a public key cipher with secret key kos. The public key cipher is most useful in a fragmented system, as described below.

The enciphered combinations are stored in the token which is then ready for use. Alternatively these combinations and the secret key may be stored in the user's workstation. More than one enciphered combination can be stored giving different capabilities or groups of capabilities and the combinations are then so stored that the function of each can be identified and the required combination selected for use.

Figure 3:
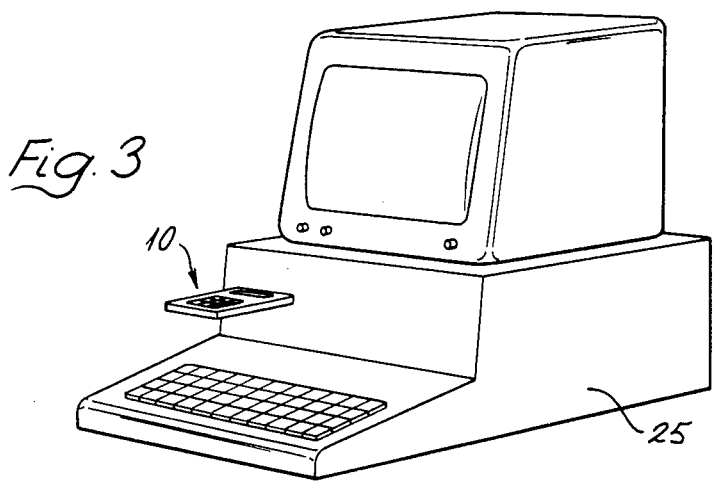
FIG. 3 is a schematic view of apparatus of FIG. 1 coupled to a computer terminal.
Figure 4B:
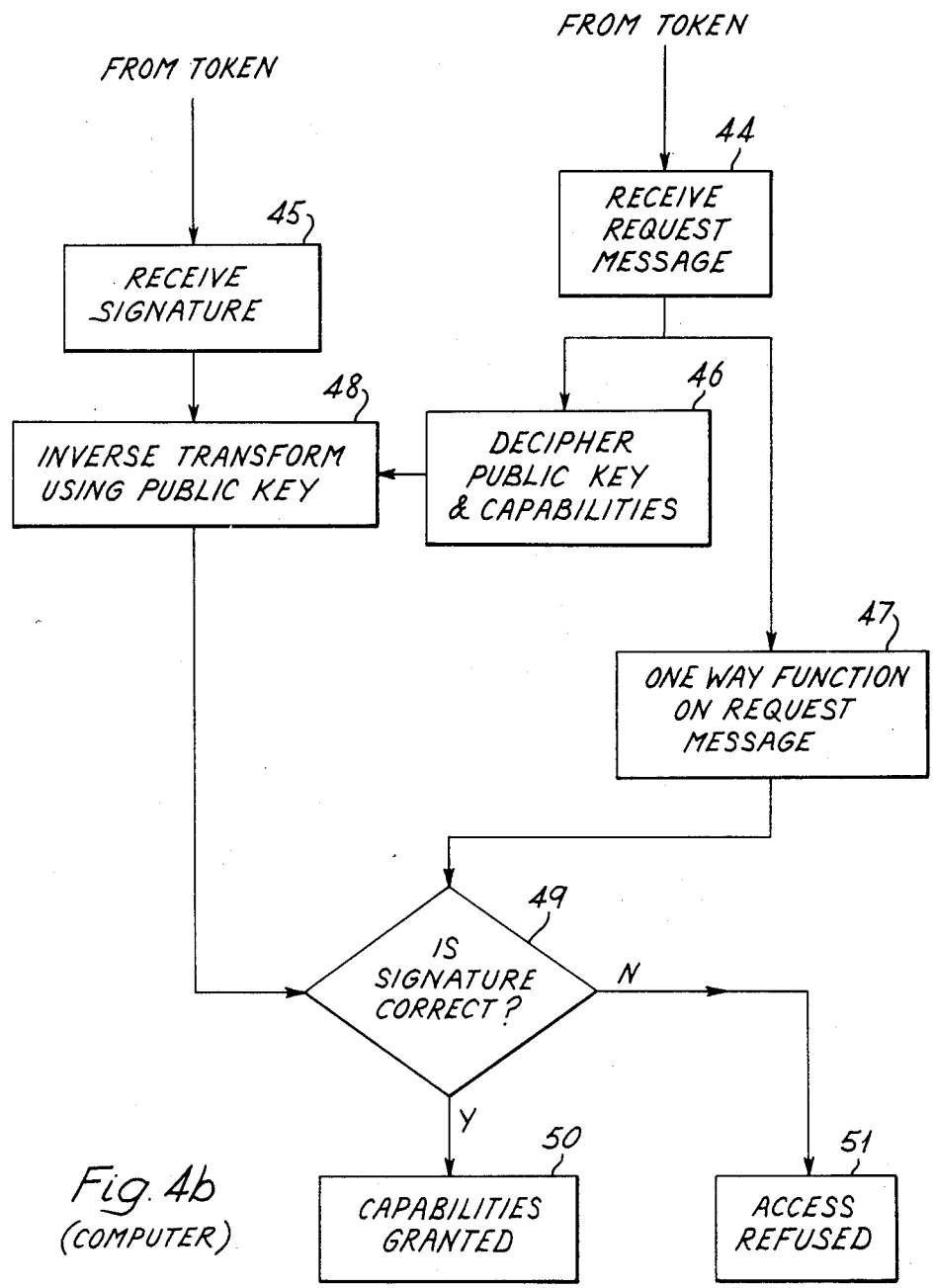

The token 10 (or the user's workstation) may now be coupled (for example by plugging in) to a terminal 25 (see FIG. 3) of the, or one of the computers of a system and caused to initiate a request for access (operation 31 of FIG. 4a which relates to the token) by making an appropriate entry on its keyboard. A request for access is started by constructing (operation 32) an access request message, for example:

access request, list of enciphered combinations (containing capabilities), sequence number of date/time. The sequence number or date/time are considered to be one form of a distinctive message, and this message may alternatively be previously obtained from the computer and may instead of, or in addition to, the sequence number or the time and date comprise a random number. If the distinctive message is obtained previously it is now combined, usually by concatenation, by the token with a signal representing the request and that at least one of the above-mentioned enciphered combinations. The signature token indicates on its display (operation 33) that an access request message is to be signed, the user enters his PIN (operation 34) and if this is correct (test 35), the request message (access request, list of enciphered combinations sequence number or date/time) is sent to the computer in an operation 42 simultaneously, the token executes. The one-way function in an operation 36, the signature is calculated using the stored secret key (operation 37) and sent to the computer (operation 38). This process has an additional step to that described in connection with FIG. 2 in that the sequence number, date/time or the distinctive message which can be regarded in relation to FIG. 2 as the input for the operation 18 (if the operation 17 is omitted) is combined with the request and the enciphered combination before the signature is generated.

The signature can be represented as

{Request, E$_{kos}$ (Ct, pk), X}signature where
- E$_{kos}$ represents enciphering by the computer using the master key kos,
- Ct represents the access message or capability conferred on the user,
- pk represents the public key corresponding to the secret key held by the token, and
- X represents the distinctive message.

If the PIN is incorrectly entered more than three times the token is disabled (test 39 and operation 4!).

Both the request message and the signature are received in operations 44 and 45 (see FIG. 4b relating to the computer) by the computer from the token. The computer uses the key kos to decipher the public key and the capabilities (operation 46) and then carries out the one-way function (operation 47). If more than one enciphered combination is received the computer may verify that all the public keys received are the same. In an operation 48 the public key is used to inverse transform the signature and then a test 49 is carried out to check the signature by comparing the access message (after the one-way function obtained by way of operations 46 and 47) with the result obtained by way of operations 45 and 46. If the signature is verified, the access message is used to confer the capabilities requested (operation 50) and thus request if it is within the capabilities conferred; otherwise access is refused (operation 51).

The sequence number or date and time is included in the request in order to prevent the re-use of the message at a later time. If a sequence number is used, the computer is able to check the correct sequence using a record of the last sequence number from this user. Such checking may be relaxed if the sequence number is administered by the token.

If the message which is to be signed is lengthy preprocessing (operation 36) to form a shorter message is used together with the corresponding operation 47 but otherwise these operations may be omitted.

As an alternative to storing the public key in the token, the request may contain the user identity when the computer extracts the public key from its files. Then in operation 46, the public key is identified for use in operation 48 from the identifying information in the request.

In this way the capability given to the signature token holder can only be used when the token is interfaced with a terminal, that is in effect, when he is present. Copying of capabilities for use by another person is thus prevented.

The application of the signature token for access to computer systems described above is particularly useful where a computer system is widely distributed, for example between several countries, since the holder of a token can move from one country to another and use his token at any terminal in the system. The token may contain a number of different capabilities which apply in different areas and give access to local capabilities only.

Most distributed computer systems are connected by communication networks so they can operate as a single system. It is sometimes more convenient in widespread systems to use only off-line connections, sending files by bulk transmissions at intervals. Such a system is known as a 'fragmented' computer. An isolated computer in such a system must make access control decisions using the data it holds and the access request messages it receives. When there are large numbers of users (for example in a world-wide videotext service) it may be costly to store tables of all user identities and their public keys at all locations.

The system of operation in which the user's public key pk is included in the external capability avoids the need for local records of all the users.

In order to establish a user's authenticity, the computer must decipher the enciphered combination so that the public key can be used to check the signature. If a symmetric cipher is used, the cipher key kos must be distributed to all parts of the system. If a public key cipher is used, those parts which do not need to create new capabilities need only be given the public key.

Any part of the system which holds the enciphered key may be allowed to create new capabilities, complying with the access rules of the system.

The programming and modification of a computer and a terminal forming part of the computer is not described in more detail than the above description since it is within the capabilities of those skilled in the art.

From the above it will be seen that the invention may take many other forms and be used in many other ways from those specifically mentioned. The computers whose capabilities are mentioned above have many different uses, for example in data bases and computer aided engineering.

I claim:

1. A method of granting access to a computer comprising:

as a first preliminary step, establishing; in an authentication apparatus, a stable record of both a) a first secret key of a public key encryption system a type of access which the computer will grant and a second public key corresponding to the secret key; and as a second preliminary step, establishing a stable record of a third key used in enciphering said enciphered information;

and additional steps employed when access is granted:

obtaining a unique message for the authentication apparatus which is different in content from other unique messages used at other times;

using the authentication apparatus to form one part of an output message to include said enciphered information produced during said first preliminary step, including said type of access information and said second public key, as enciphered in said second preliminary step, and using the secret key to encipher the unique message to generate another part of the output message;

using the computer to decipher the enciphered information to obtain information including the deciphered public key, and to decipher the enciphered unique message of the output message using the deciphered public key; and comparing digital signals representing the result of the deciphered unique message with digital signals indicative of the unique message and granting the predetermined access to the computer only if the digital signals compared are substantially the same.

2. The method as in claim 1 wherein said unique message includes at least one of a time stamp, a date stamp, sequence number, and a random number which is supplied from said computer to said authentication apparatus.

3. A method to claim 1 wherein the said one part of the output message also includes the unique message.

4. A method according to claim 1 wherein when access is to be granted, the computer orginates the unique message and supplies it to the authentication apparatus before the output message is formed.

5. A method as in claim 4, wherein said unique message originated by said computer is a random number.

6. A method according to claim 1 wherein the unique message is combined with the enciphered information and enciphered with the enciphered information in generating the said other part of the output message.

7. A method according to claim 6 including pre-processing the information for the said other part of the output message using a one-way function, and comparing the result of the inverse transform with a result obtained by pre-processing the unique message and the enciphered information in the same way before granting access.

8. A method according to claim 4 wherein the unique message comprises at least one of the following check portions: an indication of where the said output message stands in a sequence of such messages, and the time of day, the date, the access only being conferred if the check portion has at least one of the correct sequence, the correct time, and the correct date, respectively.

9. A method according to claim 1 wherein the authentication apparatus is a signature token or a workstation.

10. Authentication apparatus for providing access to a computer comprising:
  a store, including a first secret key of a public key encryption system for encrypting data, and producing enciphered information specifying both a type of access which the computer is to grant and a second public key corresponding to the secret key;
  input/output means for receiving and transmitting electrical digital messages to, and from, the apparatus; and
  means for forming an output message, including one part which includes said enciphered information including saids type of access and said public key, and for obtaining and enciphering a unique message, which is of a type which can be recognized as proper by said computer but which is different from other unique messages used at other times, using the first secret key, to generate another part of the output message.

11. Authentication apparatus according to claim 10 wherein the apparatus is arranged to form the one part of the output message to contain the unique message.

12. Authentication apparatus according to claim 11 wherein the apparatus is constructed to combine the unique message and the enciphered information before transforming the combination to form another part of the output message.

13. Authentication apparatus according to claim 10, arranged to pre-process the information from the another part of the output message according to a one-way function in generating the another part.

14. An apparatus as in claim 10, wherein said unique message includes at least one of as time stamp, a date stamp, a sequence number, and a random number which is supplied from said computer to said authentication apparatus.

15. An apparatus as in claim 10 wherein said apparatus further comprises means for erasing contents of the store when normal power supply thereto is interrupted therefrom.

16. An apparatus as in claim 10 comprising a prestressed member, coupled to the store for damaging the store if an attempt is made to open the housing.

17. A computer programmed to carry out steps on receipt of a two part message when access to the computer is requested, one part of said message including, in enciphered form information specifying 1) a type of access which the computer is to confer and 2) a public key of a public key of a public key encryption system, and a second part of said message including a unique message, which can be recognized by said computer but which is different from other unique messages used at other times, transformed using a secret key,
  a first step being to decipher the one part of the two part message to obtain information including a deciphered public key, and
  a second step being to decipher the other part of the two part message using the deciphered public key corresponding to the secret key to determine whether the result after said deciphering includes the original message, and if so to confer the type of access specified by the deciphered information.

18. A computer according to claim 17 programmed to obtain the unique message from the one part of the message for use in determining whether the said result contains the distinctive message.

19. A computer according to claim 17 programmed to transmit the unique message to authentication apparatus when the apparatus initiates a request for access to the computer.

20. A computer according to claim 17 where the said other part of the output message from the authentication apparatus includes, in enciphered form, the one part of the message, wherein the computer is programmed to provide said access only if on deciphering said other part of the output message, the second public key and type of access are as contained in the said one part.

21. A computer according to claim 20 for use where the information for the said other part of the message is pre-processed using a one-way function, wherein the computer is programmed to pre-process the said one part of the message according to the one-way function for use in determining whether the said other part of the message contains the said one part of the message.

22. A method according to claim 1 wherein the said one part of the output message contains a request for access to a particular computer capability and the request is met only if it is within the capabilities granted.

23. A programmed computer according to claim 17 wherein the said one part of the message transmitted contains a request for access to a particular computer capability and the computer is programmed to meet the request only if it is within the capabilities conferred.

24. A computer as in claim 17, wherein said unique message includes at least one of a time stamp, a data stamp, a sequence number, and a random number which is supplied form said computer to which access is requested.

* * * * *